Oct. 26, 1954

W. S. WILLIS 2,692,468

COTTON BOLL HARVESTER

Filed March 2, 1951

WILLIAM S. WILLIS
INVENTOR.

BY Cecil L. Wood

ATTORNEY

Oct. 26, 1954  W. S. WILLIS  2,692,468
COTTON BOLL HARVESTER
Filed March 2, 1951  4 Sheets-Sheet 2

WILLIAM S. WILLIS
INVENTOR.

BY Cecil L. Wood

ATTORNEY

Oct. 26, 1954        W. S. WILLIS        2,692,468
COTTON BOLL HARVESTER

Filed March 2, 1951                            4 Sheets—Sheet 3

WILLIAM S. WILLIS
INVENTOR.

BY *Cecil L. Wood*

ATTORNEY

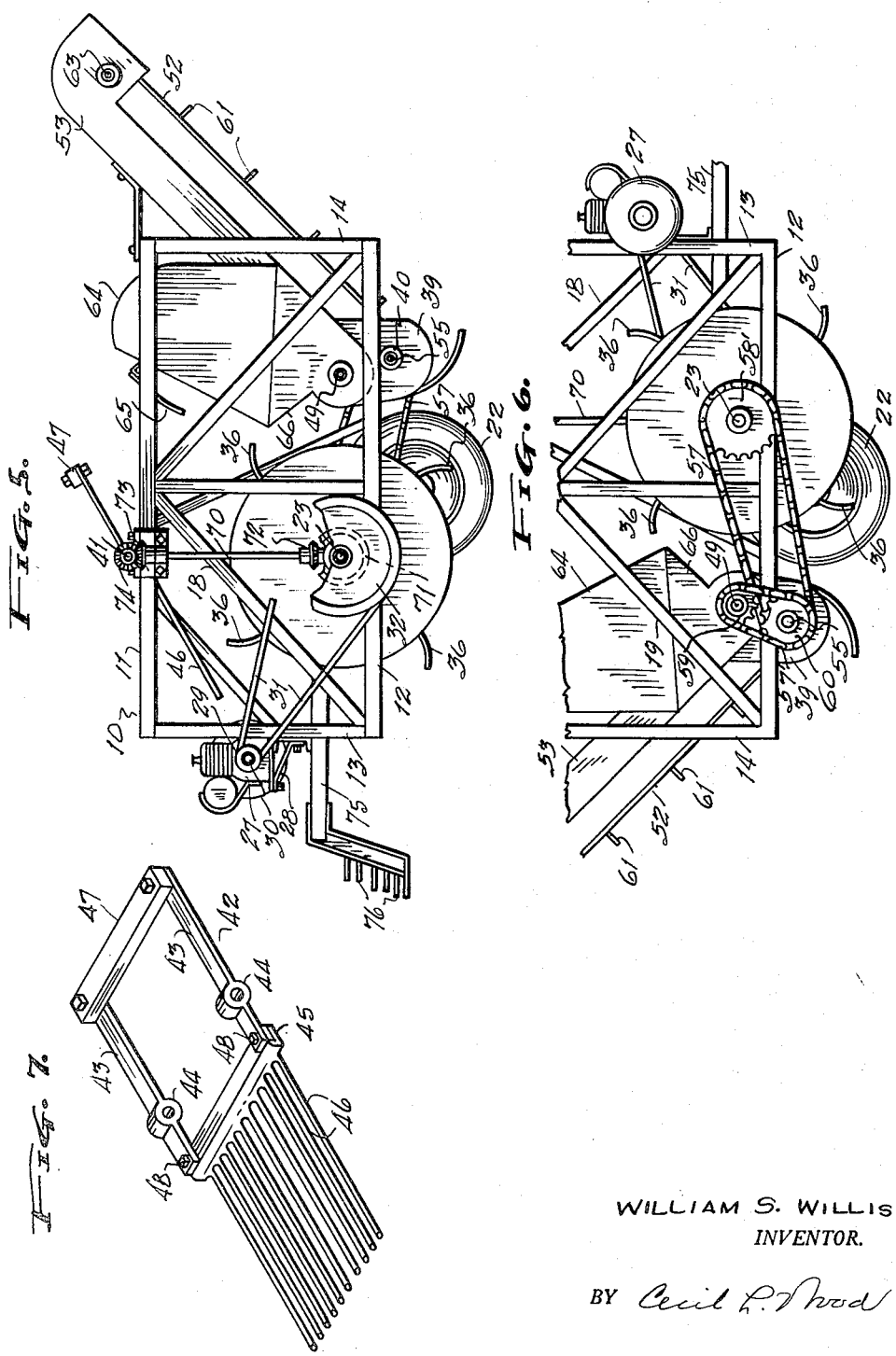

Patented Oct. 26, 1954

2,692,468

UNITED STATES PATENT OFFICE 2,692,468

COTTON BOLL HARVESTER

William S. Willis, Fort Worth, Tex.

Application March 2, 1951, Serial No. 213,644

3 Claims. (Cl. 56—35)

This invention relates to a machine for pulling bolls from cotton stalks whereby the cotton can be harvested, and it has particular reference to a self-driven mechanism drawn behind an agricultural tractor, and its principal object resides in the provision of a mobile mechanism for gathering cotton in the bolls from stalks grown in the field in rows, and a prime object of the invention is that of collecting the bolls from two or more rows of stalks at one operation and deliver the same to a mobile container moved along behind the pulling mechanism.

An object of the invention is that of providing a portable machine by which a maximum cleaning of the stalks can be accomplished and all bolls can be removed therefrom to insure economical operation with a minimum of effort, and to transfer the collected bolls to a portable container, such as a trailer, with the least amount of expended effort so that, when the bolls are gathered, they can be economically transported to a gin, or other processing plant, without unloading or being transferred to other means of transportation.

A still further object of the invention is that of providing a cotton boll pulling device by which a plurality of rows of cotton can be harvested by stripping the stalks and throwing the bolls rearwardly into a receiving hopper by suitable doffing means cooperating with rotary stripping elements, and automatically raising the products thus collected into a conveyance, as described, and affording a separate prime mover for the machine from that of the tractor by which the mechanism is drawn.

Broadly, the invention contemplates the provision of a cotton boll pulling machine of the character described in United States Letters Patent No. 2,528,102, issued to William S. Willis, dated October 31, 1950, and embodies certain improvements not included in said patent.

While the foregoing objects are paramount, other and lesser objects will become manifest as the description proceeds, taken in connection with the appended drawings wherein:

Figure 3 is a vertical sectional view on lines 3—3 of Figure 2 illustrating the hopper and conveyor therein, and the elevator mechanism.

Figure 4 is an isometric illustration of one of the sets of stripping elements comprising the stripping rotors.

Figure 5 is a left-side elevational view on a reduced scale of the invention, with the wheel removed, illustrating the driving elements for the stripping rotors and doffing members.

Figure 6 fragmentarily illustrates the right side of the invention and shows the driving mechanism for the conveyor and elevator elements, and Figure 7 is an isometric illustration of one of the doffing members which cooperates with the stripping rotors.

Figure 2:
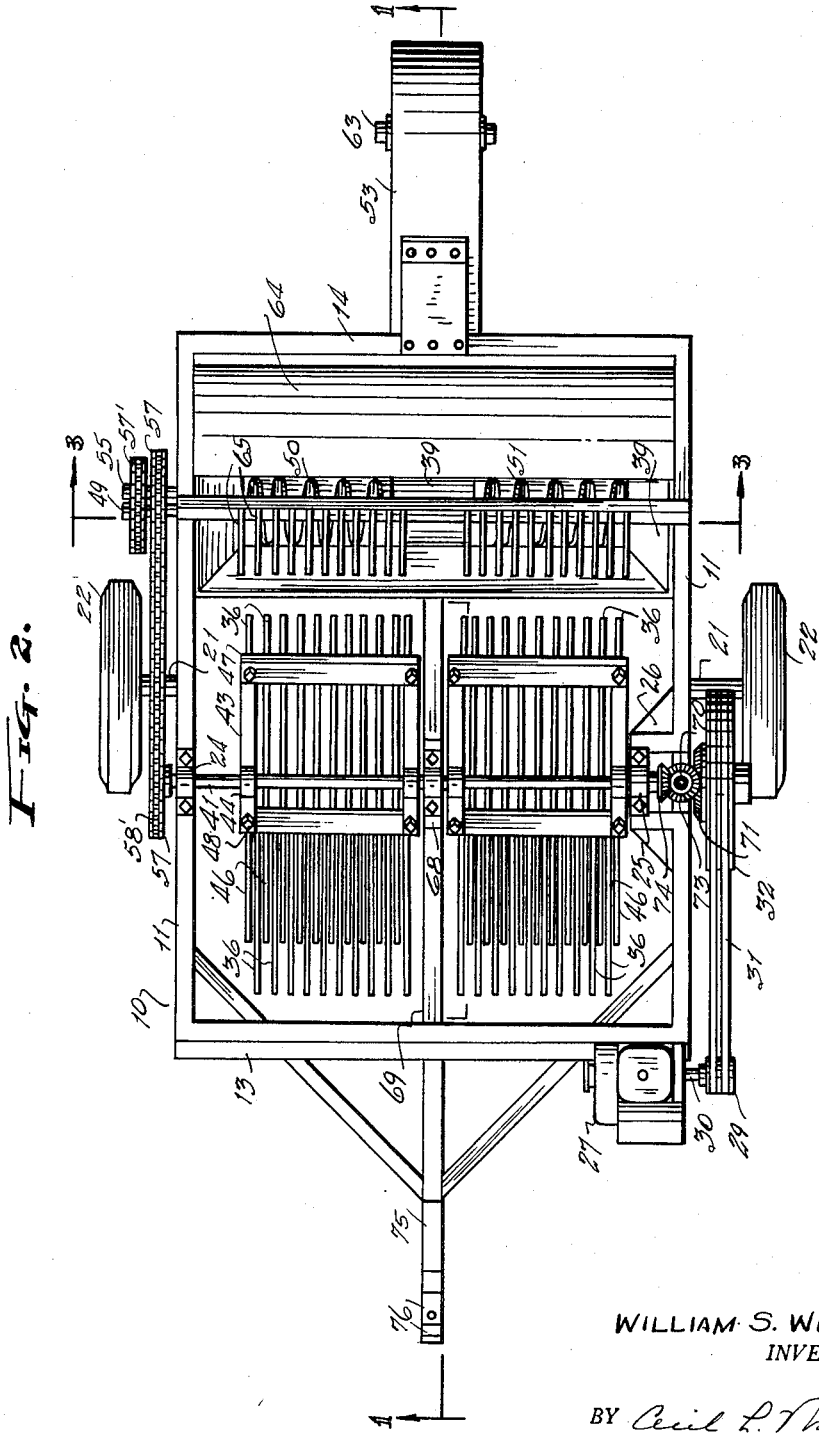
Figure 2 is a plan view of the invention showing the rotary stripping elements, the cooperating doffer mechanism, and the hopper conveyors.

The invention, therefore, is provided with a mobile frame 10 comprising upper and lower rectangular members 11, 11', 12 and 12', preferably of channel iron, and vertical standards 13, 14, 15 and 16, with angular members 17, 18, 19 and 20 for properly bracing the same. The frame 10 is supported on an axle 21 having pneumatically tired wheels 22 on each end, as illustrated in Figure 2. A shaft 23 is arranged transversely of the frame 10 and is journalled at each end in bearings 24 and 25 attached to one of the lower frame members 12, on one side and upon a bracket 26 secured to the opposite frame member 12, as shown in Figure 2.

It is desirable that the mechanism supported in the frame 10 be driven by a prime mover 27, such as a gasoline engine, or the like, supported forwardly of the frame 10 on a suitable bracket assembly 28, as shown in Figures 2, 5 and 6, and has a V-pulley 29 on its shaft 30 over which is arranged V-belts 31 which are passed over a larger V-pulley 32 on one end of the shaft 23 to drive the same. A pair of rotating stripping members 33 are arranged on the shaft 23 and these consist of a series of hub members 34 which have radial flanges 35 which extend longitudinally of the shaft 23 and provide means for attaching the curved tines 36 at spaced intervals along the hub members 34 by bolts 37, as shown in detail in Figure 1.

Figure 1:
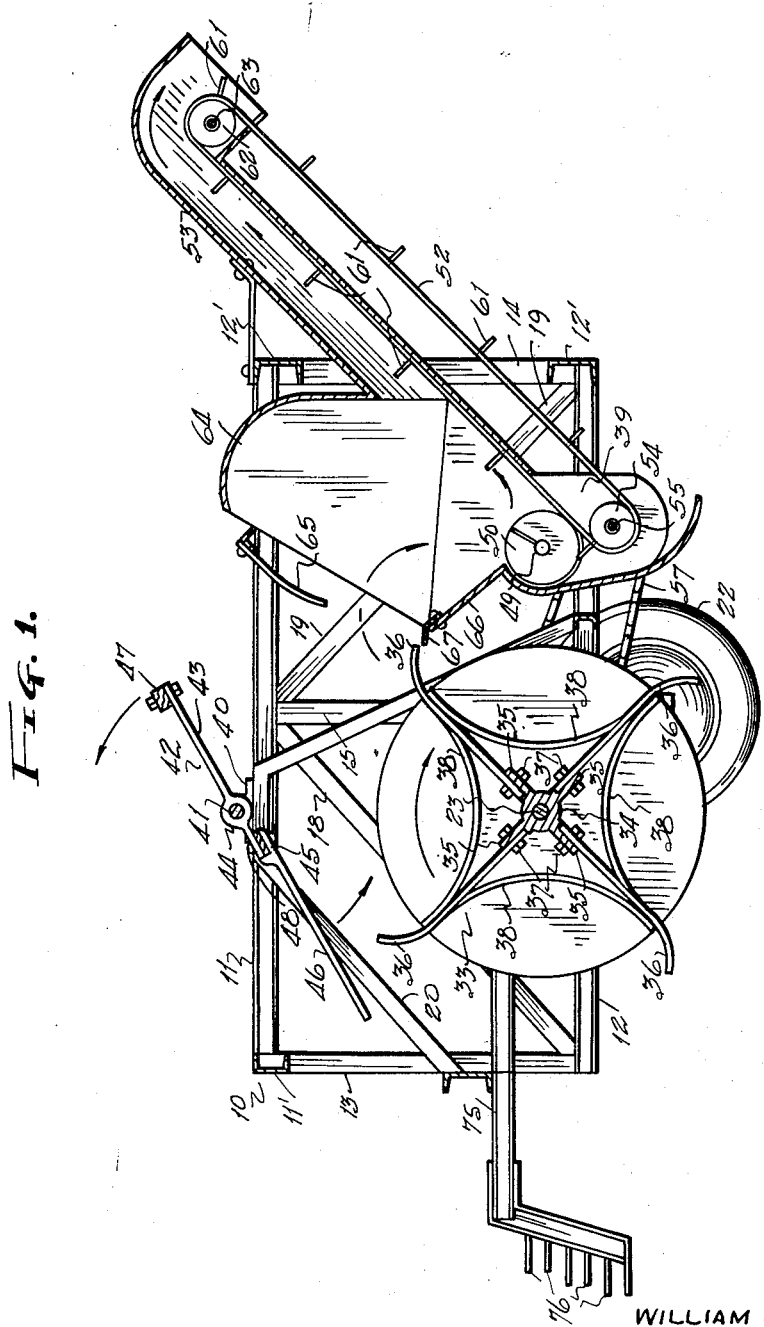
Figure 1 is a longitudinal sectional view of the invention on lines 1—1 of Figure 2 illustrating the cooperating stripping rotors and doffing fingers, and showing the receiving hopper and elevator.

The tines 36 are integrally associated into a unit, which is illustrated in Figure 4, by curved brackets 38 which form a substantially rectangular frame and brace the members 36 whose outer ends are curved in the direction of rotation so as to more readily pick up the bolls from the cotton plants and deliver them rearwardly toward the hopper 39 located in the rear portion of the frame 10, as more particularly shown in Figure 1, and as will become apparent as the description proceeds.

Above the shaft 23, and supported on the upper side frame members 11 and 12 in bearings 40, is another transverse shaft 41 which is aligned with the shaft 23 and its function is to support a plurality of doffing assemblies 42, shown in detail in Figure 7, and comprising frames 43 formed on each side with bosses 44 through which the shaft 41 is arranged. Attached to one end of the frames 43 are bars 45 which have fingers 46 formed therewith extending at right angles and spaced apart so as to pass between the tines 36 of the rotors 33.

Opposite the fingers 46 is a counterweight 47 secured to the outer ends of the frame members 43 which serve to counter-balance the fingers 46 in the rotation of the members 41 which rotate in a direction opposite to that of the rotors 33, or clockwise as viewed in Figure 1, to direct the bolls picked up by the rotors 33 rearwardly into the hopper 39, the fingers 46 passing between the tines 36 of the rotors 33, and in an opposite direction of rotation, to insure the delivery of the bolls to the hopper 39. The bars 45 are secured to the frames 43 by bolts 48, as are the counter-weight members 46.

In Figure 1 the arrows indicate the clockwise rotation of the rotor elements 33, on each end of which is a disk 47, and the counter-clockwise rotation of the doffing elements 42, another arrow indicating the movement of the cotton bolls to the hopper 39. In the hopper 39 is a shaft 49, which is also arranged transversely of the frame 10, as shown in Figures 1, 2 and 3, on which is arranged right- and left-hand flight conveyors 50 and 51 which operate in opposite directions so as to direct the products to the center of the hopper 39 and concentrate the bolls upon the elevator belt 52 which raises the bolls upwardly through a chute 53 and into a trailer (not shown) drawn behind the machine.

The elevator belt 52 is operated over a pulley 54 on a shaft 55 which is journalled in a bearing 56 on the lower side of one of the lower side frame members, as shown in Figure 3, and is driven by a chain 57 arranged over sprockets 58 and 58' on the shafts 55 and 23, respectively, the latter supporting the rotors 33. The shaft 49, carrying the flight conveyors 50 and 51, is driven by a chain 57' on sprockets 59 and 60 on the shafts 49 and 55, respectively, the latter being below and slightly rearwardly from the shaft 49, as apparent in Figures 1 and 3. The elevator belt 52 has a series of spikes 61 thereon for carrying the bolls upwardly through the chute 53 and into the trailer, the upper end of the belt 52 being arranged over a pulley 62 on a shaft 63 arranged transversely of the upper end of the chute 53, as shown in Figures 1 and 2.

Above the hopper 39 is provided a hood 64 before which is arranged a series of depending ribs 65 which are preferably flexible and extend forwardly. The members 65 are spaced apart so that the fingers 46 of the doffing members 42 can be passed between and these function to properly direct the bolls into the hopper 39, an apron 66, rising upwardly and forwardly, at approximately 45 degrees from the forward edge of the hopper 39, also serving to direct the bolls into the hopper 39. Along the upper edge of the apron 66 is arranged a flexible baffle 67 which extends forwardly of the apron 66, as shown in Figure 1.

The shaft 41, on which the doffer assemblies 42 are mounted, is also supported intermediate its ends by a bearing 68 on a frame bar 69 arranged longitudinally of the frame 10, as shown in Figure 2. The shaft 41 is driven by a vertical shaft 70 which is rotated by a bevel gear 71 on the shaft 23 which meshes with a bevel pinion 72. The upper end of the shaft 70 has a bevel pinion 73 thereon which is meshed with a bevel pinion 74 on the shaft 41.

The implement is drawn behind a conventional tractor through the medium of a hitch 75 which may be provided with a plurality of pairs of clevises 76 at different elevations, as shown in Figures 1 and 5, to accommodate tractors of different manufactures.

In operation, therefore, the invention is drawn along the rows of cotton plants, preferably at least two rows at a time, so that each of the rotors 33 can strip the plants of all of the bolls, revolving rearwardly to cast their burdens into the hopper 39, the fingers 46 of the doffers 42 passing between the tines 36 of the rotors, moving in an opposite direction, to insure a complete discharge of the bolls into the conveyors 50 and 51 to deliver the gathered bolls to the center of the hopper and on to the elevator belt 52. The direction of rotation of the members 33 and 42 are indicated by arrows, as well as the travel of the bolls to the hopper and up the chute 53.

It is, of course, possible and even feasible to operate the mechanism by the power take-off of a tractor, but because there is some variation in speed, such as in turning at the ends of rows, which is encountered by the tractor operations, it is desirable to provide an independent prime mover 27 for the machine. It is also desirable to provide a clutch for the engine 27 by which the machine can be operated at will without regard to its ground speed or movements along the ground, as in turning, and the like. The entire assembly is operated in synchrony and thus affords a device which is thoroughly capable of accomplishing the operations for which it is designed.

Manifestly, the structure herein shown and described is capable of certain changes and modifications, by persons skilled in the art, without departing from the spirit and intent of the invention or the scope of the appended claims.

What is claimed is:

1. In a machine for gathering cotton bolls, the combination of a wheeled frame and a boll-receiving hopper supported rearwardly and transversely of said frame and having a hood thereabove, a series of flexible spaced ribs arranged along the front of said hood above said hopper, a plurality of rotors supported on a shaft forwardly of said frame and rotatable opposite to the direction of travel of said frame, each having sets of spaced fingers capable of engaging and stripping bolls from cotton stalks in the path of said machine, a doffing member rotatably supported in said frame above each of said rotors and cooperating therewith and with said spaced ribs to dispense said cotton bolls rearwardly into said hopper as said rotors receive said bolls, the said doffing members comprising frames having fingers thereon projected in the plane of said frame and a counter-weight opposing said fingers, and conveyor means communicating with said hopper for transferring said bolls to a wheeled container rearwardly of said frame.

2. In a cotton boll pulling machine, in combination with an open wheeled frame adapted to be drawn by a tractor, and having a boll receiving hopper supported rearwardly of said frame and having conveyor means therein concentrating the gathered bolls centrally of said hopper, a hood above said hopper having a series of spaced ribs depending therefrom above said hopper, a pair of rotary tined stripping elements mounted forwardly of said frame and revolving oppositely to the direction of travel of said machine in operative relation to said hopper, a rotary doffing element comprising a weighted frame having fingers thereon cooperating with each of said rotary stripping elements and said depending ribs and mounted for opposite rotation with respect thereto, whereby to remove the bolls received thereby into said hopper, and conveyor means communicating with said hopper for loading said gathered bolls into a mobile carrier drawn by said machine.

3. In a machine for gathering cotton bolls having an open wheeled frame and a receiving hopper arranged transversely of said frame rearwardly thereof, and a flight conveyor means in said hopper gathering the contents centrally thereof, in combination, a hood above said hopper and a series of spaced ribs along said hood above said hopper, a plurality of rotor elements mounted forwardly of said frame and having spaced tines extending therefrom engageable with the cotton plants in the path of said frame, a rotary doffing element mounted above each of said rotor elements, and comprising a weighted frame having tines thereon corresponding to the spacings between the tines of said rotor elements and said spaced ribs and moving oppositely thereto whereby to remove the bolls gathered by said rotor elements and deposit the same in said hopper, and elevating means communicating with said hopper for transferring said bolls therefrom to a mobile receiving unit connected to said machine.

References Cited in the file of this patent

UNITED STATES PATENTS

| Number | Name | Date |
|---|---|---|
| 1,793,426 | Kent | Feb. 17, 1931 |
| 2,445,162 | Wallace | July 13, 1948 |
| 2,528,102 | Willis | Oct. 31, 1950 |